June 18, 1957 P. J. BELANGER 2,796,191
RECEPTACLE HAVING A DETACHABLE ROTARY CLOSURE
Filed Feb. 28, 1956
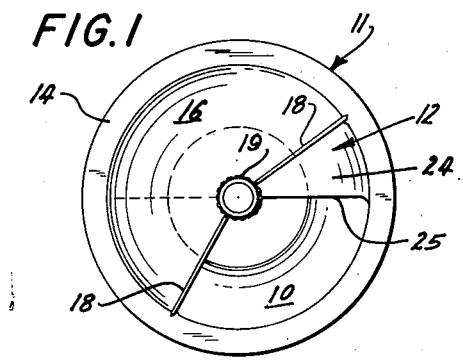
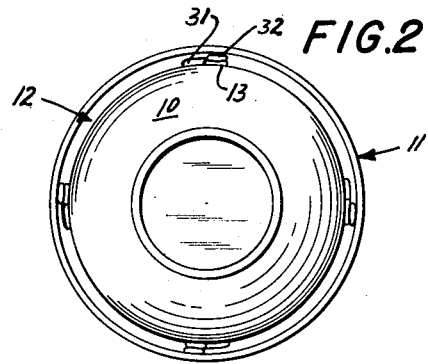
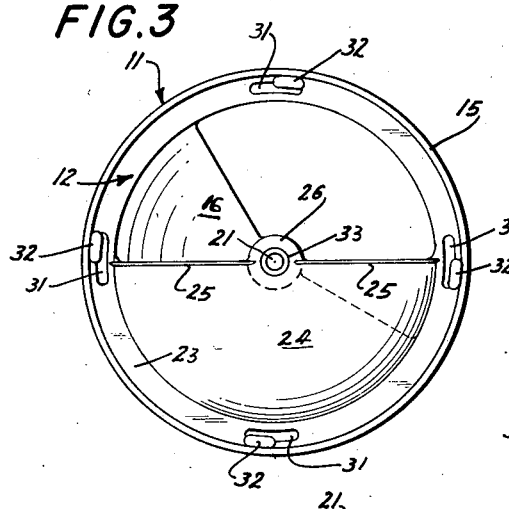
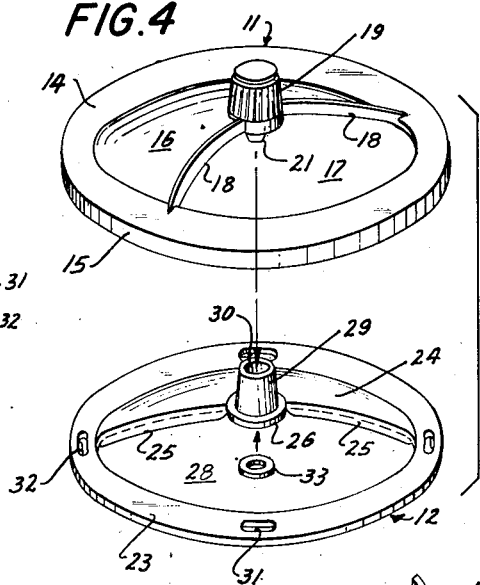
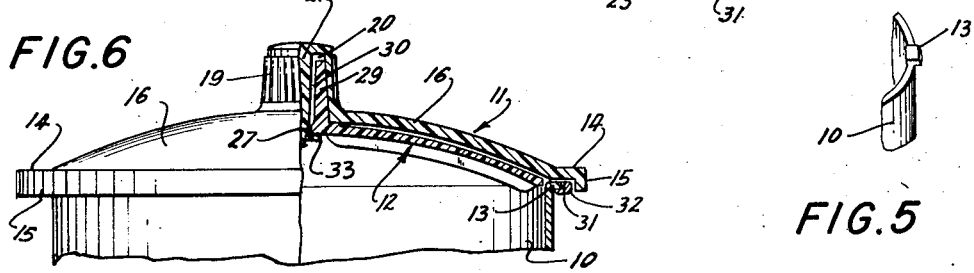
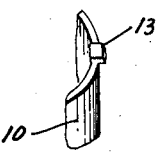
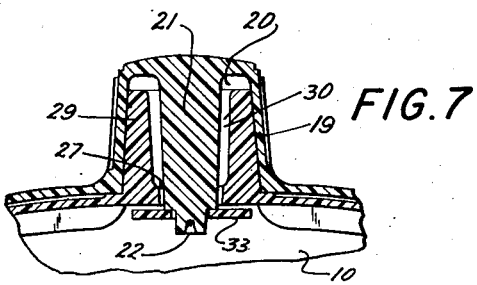
INVENTOR
PAUL J. BELANGER
BY
ATTORNEY United States Patent Office 2,796,191
Patented June 18, 1957

2,796,191

RECEPTACLE HAVING A DETACHABLE ROTARY CLOSURE

Paul J. Belanger, Leominster, Mass., assignor to Foster Grant Co., Inc., Leominster, Mass., a corporation of Massachusetts Application February 28, 1956, Serial No. 568,356

3 Claims. (Cl. 220—33)

This invention relates to a receptacle having a detachable rotary closure. The receptacle is intended to hold and dispense various comestibles or other substances, as, for example, a sugar bowl.

One object of the invention is to provide a receptacle having a two part closure or cover assembly of simple construction, one of which parts is rotatable relatively to the other.

Another object is to provide a two part assembly that can be readily attached to or detached from a receptacle as a unit.

A further object is to provide a receptacle having a rotary cover which consists essentially of only three molded pieces that are inexpensive to manufacture and easy to assemble.

A still further object is to provide the cover with means for manually opening the receptacle to dispense its contents in part or in whole, and for closing the receptacle to protect its contents.

The construction of the device permits of easily and thoroughly cleaning both the cover and the receptacle itself.

A preferred embodiment of the invention is illustrated in the accompanying drawings, in which:

Fig. 1 is a top plan view of the receptacle showing its rotary cover in partly open condition;

Fig. 2 is a bottom plan view of the receptacle and cover;

Fig. 3 is a rear view of the cover assembly;

Fig. 4 is an exploded view in perspective of the cover assembly:

Fig. 5 is a fragmentary view in perspective of a portion of the upper rim of the receptacle base showing one of the ears for detachably securing the cover assembly to the receptacle;

Fig. 6 is a fragmentary view of the receptacle and cover assembly, partly in section; and, Fig. 7 is an enlarged fragmentary vertical sectional view of the central portion of the cover assembly.

The receptacle comprises a hollow concave base or body member 10 of bowl form, and a cover assembly consisting essentially of a top member 11 and a bottom member 12, all of which parts may be easily and inexpensively made of molded plastic, although they may be made of other suitable materials.

The rim of the base 10 has a plurality of ears 13, in the present instance four, projecting outward therefrom. The ears are provided to permit of detachably securing the cover assembly to the base.

The top cover member 11 has an annular outer rim portion 14 having a downwardly extending flange 15, and a partly domed solid inner segmental portion 16. The inner portion has a discharge opening 17, which may also be of segmental shape, as shown. The edges of the portion 16, adjacent the opening 17, may be reenforced with upstanding ribs or fins 18. A knob 19, which may be knurled or plain surfaced, extends up from the center of the solid cover portion 16 to provide a handle for rotating the cover member 11.

The knob 19, as shown in Figs. 6 and 7, has an upwardly tapered interior cavity 20. A terete shaped post 21 extends downwardly in the center of the cavity. The lower end of the post may be constricted and formed with an indentation 22.

The bottom cover member 12 comprises an annular outer rim portion 23 and a solid inner portion 24 of approximately the corresponding size and shape of the solid inner portion 16 of the top cover member 11. The edges of the portion 24 may be reenforced with downwardly extending ribs or fins 25. The center of the portion 24 has a semi-circular part 26 having a circular hole 27 through which the lower end of post 21 projects when the cover members are assembled. The bottom cover member has an opening 28 that corresponds substantially to the opening 17 in the top cover member. A terete shaped bearing block 29, having a central vertical opening 30, projects upward from the center of the cover portion 24. On assembly of the two cover members the block 29 fits freely in the cavity 20 of knob 19, with the post 21 entered in the opening 30, to serve as a bearing about which the top cover member may be rotated relatively to the bottom cover member so as to open the discharge passage, formed by the openings 17 and 28, fully or to any desired extent, or to close said passage completely.

The annular rim portion 23 of bottom cover member 12 has a plurality of elongated slots 31 extending through it. In the present instance four such slots are provided to correspond to the number of ears 13 of the base member 10. On the inner or lower face of the rim portion 23 and at one end of each slot 31 is a lug 32 that extends partly over the outer edge of the slot.

The two cover members may be rotatably secured together in their assembled relationship in any suitable manner. In the present case such securement is effected by placing a washer 33 about the constricted lower end of the post 21 and then peening over or spreading the material around the indentation 22 to clamp the washer in place, as in Figs. 3 and 6.

The cover assembly is attached to the base by placing it upon the base with ears 13 of the latter disposed in the slots 31 of the bottom cover member 12, and then partly turning or rotating said cover member so that its lugs 32 will be moved to a position under and in engagement with the ears 13, as best seen in Figs. 3 and 6, thus interlocking the base and the cover assembly. By turning the bottom cover member in the reverse direction, the cover assembly may be detached from the base. When the cover assembly is attached to the base, the cover may be opened to discharge, or closed to protect, the contents of the receptacle by turning the knob 19 of the top cover member 11 in one direction or the other. When the openings 17 and 28 of the two cover members are substantially in registration, the user's hand may be inserted in this opening so as to turn the bottom member as required to attach the cover to, or to release it from, the base member 10. To facilitate freedom of the turning and interlocking movements a slight vertical play of the two cover members may be permitted in the assembly.

While I have illustrated and described a preferred embodiment of the invention, it will be understood by those skilled in the art that various modifications in the details of the construction and arrangement of the parts may be made within the scope of the claims.

What I claim is:

1. A receptacle cover assembly comprising a top cover member and a bottom cover member, each member having a solid inner portion, an open inner portion, and an annular rim surrounding said portions, the top cover member having a central hollow knob with an interior post extending downward from the center of the top of the knob, the bottom member having a bearing extending upward from its center, said bearing being adapted to fit into the cavity of the knob and having a central vertical opening into which the post of the knob fits rotatably.

2. A receptacle cover assembly comprising a top cover member and a bottom cover member, each member having a solid inner portion, an open inner portion, and an annular rim surrounding said portions, the top cover member having a central hollow knob with an interior post extending downward from the center of the top of the knob, the bottom member having a bearing extending upward from its center, said bearing being adapted to fit into the cavity of the knob and having a central vertical opening into which the post of the knob fits rotatably, the lower end of the post extending below the lower face of the bottom cover member, and means on the lower end of the post for fastening the two cover members rotatably together.

3. A receptacle comprising a hollow bowl having a circular rim with a plurality of spaced ears projecting laterally outward therefrom, and a two-part cover assembly detachably secured to the bowl, the cover assembly including top and bottom members fastened together for relative rotary movements, each cover member having a circular rim adapted to fit over the rim of the bowl and its ears, the rim of the bottom cover member bearing directly on the rim of the bowl and being provided with a plurality of slots corresponding in number and spacing to the ears of the bowl, a lug adjacent one end of each slot, the lug projecting inward from the rim of the bottom cover member and extending part way under the slot, whereby the cover assembly may be detachably secured to the bowl by inserting the ears in the slots and giving the cover member and the bowl a part turn relatively to each other to slide the ears into locking engagement between the upper face of the lugs and the lower face of the rim of the bottom cover member.

References Cited in the file of this patent

UNITED STATES PATENTS

| | | |
|---|---|---|
| 946,271 | Reeves | Jan. 11, 1910 |
| 1,260,262 | Hills | Mar. 19, 1918 |
| 1,593,900 | Erikson | July 27, 1926 |
| 2,142,402 | Marschall | Jan. 3, 1939 |